July 15, 1969      R. L. DEGA      3,455,564

HIGH PRESSURE LIP SEAL

Filed Jan. 26, 1967

INVENTOR.
Robert L. Dega
BY
E. J. Biskup
ATTORNEY

United States Patent Office 3,455,564
Patented July 15, 1969

3,455,564
HIGH PRESSURE LIP SEAL
Robert L. Dega, Mount Clemens, Mich., assignor to General Motors Corporation, Detroit, Mich., a corporation of Delaware
Filed Jan. 26, 1967, Ser. No. 611,927
Int. Cl. F16j 15/32, 15/48
U.S. Cl. 277—134                          4 Claims

ABSTRACT OF THE DISCLOSURE

A fluid seal for sealing the space between two relatively rotating members including a sealing annulus having a seal lip. The sealing annulus is supported by a casing fixed with one of the members while the seal lip circumferentially engages the other member. An annular support ring is associated with the sealing annulus and serves to prevent radially inward deformation of the seal lip beyond a predetermined amount.

---

In high pressure fluid applications, a conventional lip seal is limited in its pressure capabilities to approximately 10 p.s.i. and even with this low pressure its life is considerably shortened. The primary difficulty is that when the seal lip is compressed onto a rotating shaft so that a contact path sufficient to support the load is formed, the lubricant is pinched off at the forward edge causing the material towards the atmospheric side to be starved for oil. As a consequence, excessive heat is developed which decomposes the lubricant film and sealing material, resulting in leakage and premature failure of the seal lip.

In order to reduce deformation of the seal lip resulting from the large pressure imbalance and thereby alleviate the above problem, heavy flex sections have been provided in high pressure seals. Such a design, however, impairs the capabilities of the seal in following eccentricity and in providing static sealing under low temperature conditions.

To overcome these difficulties, the seal made in accordance with the present invention uses a support ring located in a groove formed in the sealing annulus to limit seal lip deformation and hydrodynamic sealing ribs to prevent leakage. In assembly, the support ring has a floating clearance with respect to the groove thereby leaving the seal lip free to follow shaft run-out and to grow and shrink according to temperature effects. When pressure is applied to the sealed fluid, the sealing annulus will be deformed inwardly until it contacts the support ring at which time deformation of the seal lip will be limited. For a given pressure environment, the ring and groove can be designed to provide a minimum path of seal contact while maintaining a continuous lubricating film across the seal lip. Hydrodynamic ribs are used to provide a pumping force to unbalance any leakage forces created and thereby seal contact alone is not relied upon to oppose leakage.

Accordingly, the objects of this invention are; to provide a high pressure seal having improved wear and sealing characteristics; to provide a high pressure seal able to follow shaft eccentricity while sealing both statically and dynamically; and to provide a seal in which deformation of the seal lip at high pressures is controlled so as to minimize the rubber contact with respect to the shaft, thereby lessening the seal wear.

The above and other objects will be apparent to one skilled in the art upon examination of the following detailed description of the preferred embodiment, reference being made to the accompanying drawings in which.

Figure 1:
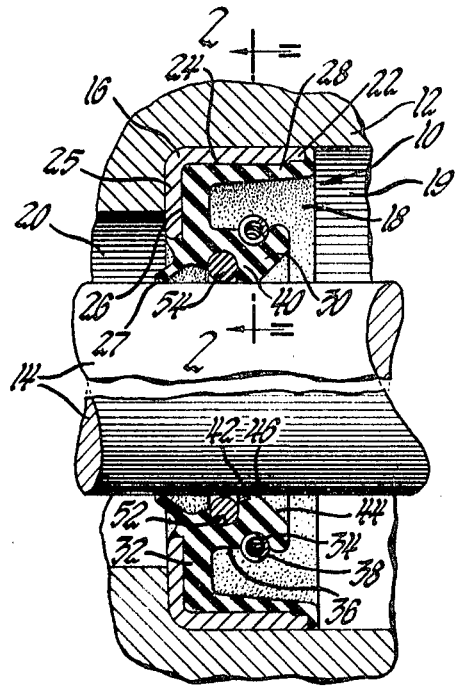
FIGURE 1 is a longitudinal cross-sectional view of a fluid seal made in accordance with the present invention.
Figure 2:
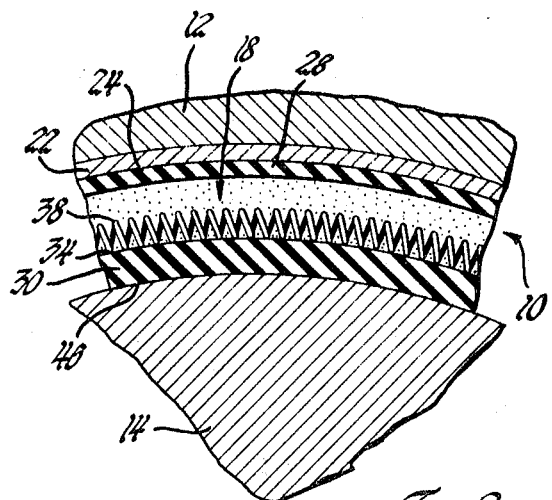
FIGURE 2 is an enlarged view taken along the line 2—2 of FIGURE 1.

Referring to FIGURE 1, a seal 10 is shown located between a housing 12 and a rotatable shaft 14 and in general comprises a ring-like metallic casing 16, the inner portion of which is bonded to an annular seal body 18. The seal 10 is designed to prevent the flow of a fluid such as oil from a fluid chamber 19 past the seal body 18 to the atmospheric side 20 of the seal in high pressure applications ranging around, but not limited to, 30 p.s.i..

More specifically, the casing 16 is generally L-shaped having a longitudinally extending outer arm 22 adapted to be sealingly fitted against and rigidly supported by the housing 12. The arm 22 is attached, by bonding or other suitable means, to the outer surface 24 of the seal body 18 and is integrally formed with a radially extending arm 25 which is similarly attached to the butt end 26 of the seal body 18. A dust shield 27 is provided on the atmospheric side 20 of the seal 10 and prevents contaminants from reaching the sealing surface and impairing the operation of the seal. The seal body 18 is formed of rubber or other similar elastomeric materials exhibiting characteristics of resiliency and durability suitable for the particular environment to which the seal will be exposed.

Figure 3:
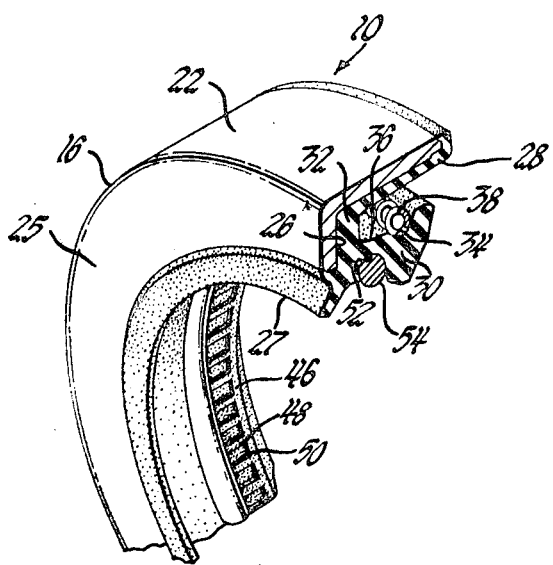
FIGURE 3 is a partial isometric cross section of the seal shown in FIGURE 1.

Referring to FIGURE 3, the seal body 18 comprises an annular support arm 28, a sealing annulus 30 and a connecting web 32. The sealing annulus 30, when in the unflexed condition, extends axially and has a circumferential groove 34 molded or otherwise formed in its outer surface 36 which accommodates an endless garter-type spring 38 or other means suitable for urging the sealing annulus 30 radially inward to wards the shaft 14.

The inner circumferential portion 40 of the sealing annulus 30 is formed with converging frustoconical walls 42 and 44 which intersect each other to form a sharp seal lip 46 extending along the inner circumference of the sealing annulus 30. A sharp seal lip 46 is used in the present invention to minimize the path of rubber contact in the full range of pressures although it is apparent that the lip will wear after an initial break-in period to a lip of a finite width. The diameter of the seal lip 46 is selected to be somewhat smaller than the diameter of the associated shaft 14 so that, in assembly, there is a slight deformation of the seal lip. This insures contact with the shaft surface about the full circumference of the seal when the members are at rest. At fluid pressures of about 30 p.s.i., an interference fit of about .050 inch has produced satisfactory results.

Formed upon the surface of the wall 42, which is preferably on the atmospheric side 20 of the seal, are a number of hydrodynamic grooves comprising ribs 48 and associated grooves 50. These are preferably ribs of the type shown and described in the copending patent application S.N. 582,368 filed on Sept. 6, 1966, in the name of Louis H. Weinand and assigned to the assignee of this invention. More specifically, the ribs are of the type shown in FIGURE 6 of the aforementioned application. When the members are rotating, these ribs provide a pumping force to unbalance any leakage forces which are present.

An annular recess 52 is formed in the inner circumference of the sealing annulus 30 and is preferably adjacent to the seal lip 46 on the atmospheric side 20 of the seal. A support ring 54 having a circular cross section is inserted into recess 52 and has an outer diameter such that, in the unflexed position of the sealing annulus 30, it will fit snugly in the recess. The support ring 54 should be located in a positon wherein radial inward deflection of the seal lip 46 can be restrained to a certain extent as explained more fully below. While the actual placement of the recess 52 can vary along the inner axial length of the sealing annulus 30, removal of any seal lip material should be avoided.

When the seal unit 10 is inserted in the housing 12 and over shaft 14, the interference fit of the seal lip 46 causes the sealing annulus 30 to deflect radially outwardly. As a result, a slight clearance is formed between the sealing annulus 30 and the support ring 54 so that the seal lip 46 is allowed to freely follow shaft runout and grow or shrink according to temperature effects. When pressure is applied to the sealed fluid in chamber 19, the sealing annulus 30 will deflect and deform radially inwardly until it contacts the support ring 54. As should be apparent, the support ring 54 serves to limit the inward deflection and accordingly the extent of contact between the seal lip 46 and the outer surface of the shaft 14. Such contact, however, is sufficient to provide almost complete dynamic sealing while maintaining a continuous lubricating oil film across the seal lip. During such time, any oil leakage past the seal lip 46 is opposed by the hydrodynamic ribs discussed above.

Prior to contacting the support ring 54, the sealing annulus 30 is loaded basically like a supported cantilever beam with the seal lip 46 deforming to partially support the load. At the point of contact between the sealing annulus 30 and the support ring 54, the latter forms an additional supporting member and the deflection characteristics of the sealing annulus are altered. It should be apparent that by properly sizing and placing the support ring 54, one skilled in the art may control the deflection and resulting deformation of the seal lip 46 and design a seal which will maintain effective static and dynamic sealing for a wide range of fluid pressures.

A seal of the above-described type has been successfully tested at 30 p.s.i., using a .005 to .010 inch clearance in assembly between the support ring 54 and the recess 52. The flex section was designed so that the sealing annulus 30 contacted the support ring 54 at about 10 p.s.i. while the garter spring 38 was tensioned to supply about 50 percent of the radial load on the seal lip 46 during normal operation. The axis of the spring 38 was located approximately .030 of an inch from the plane of the seal lip 46 so that approximately uniform pressure would be applied across the width of the seal lip 46 thereby insuring a continuous lubricating film and avoiding the problems of overheating and decomposition previously mentioned.

While the support ring disclosed with this invention has a circular cross section it should be apparent that other configurations could be successfully used in such a seal.

Since certain obvious changes and modifications will be apparent to one skilled in the art, the scope of the invention, as defined by the appended claims, is intended to cover such alterations of the illustrative embodiment.

I claim:

1. A lip seal for sealing the space between relatively rotating members and preventing the flow of fluid from a chamber, comprising; a flexible sealing annulus attached to one of the members and including a seal lip defined by converging frustoconical walls; spring means for radially biasing said seal lip into sealing engagement with said other of said rotating members; and a support member located adjacent the frustoconical wall spaced from said chamber by said seal lip and being radially spaced from said other of said rotating members and said sealing annulus in assembly, said sealing annulus radially deforming upon an increase in pressure in said chamber until contacting said support member at which time the latter serves to limit additional deformation of said seal lip.

2. A lip-type shaft seal for sealing a rotating shaft and preventing the flow of fluid from a chamber, comprising; an annular casing; an elastomeric sealing annulus having one end attached to the casing and a radially inwardly facing sealing lip formed at the other end thereof which is defined by converging frustoconical walls; an annular groove formed in an outwardly facing surface of said sealing annulus; a tensioned spring retained within said groove for radially inwardly biasing said seal lip into sealing engagement with said shaft; a support member located between said seal lip and said one end of said sealing annulus, said support member having a floating clearance in assembly with respect to said shaft and said sealing annulus under low-pressure conditions in said chamber and contacting said sealing annulus under predetermined high-pressure conditions in the chamber thereby limiting further deformation of said seal lip.

3. The shaft seal as recited in claim 2 wherein an annular recess is formed in a radially inwardly facing surface of the sealing annulus between said one end and said seal lip, and said support member has a clearance with said recess in assembly under low-pressure conditions in said chamber.

4. A lip-type shaft seal for sealing the space between a housing and a rotating shaft and preventing the flow of fluid from a chamber, said chamber containing fluid under variable pressure, comprising; a metallic casing supported by the housing; a sealing annulus attached to said casing and including a radially inwardly facing seal lip defined by converging frustoconical walls; a plurality of helically disposed ribs formed on the frustoconical wall spaced from said chamber by said seal lip, said ribs being effective to provide a hydrodynamic pumping force to oppose fluid leakage past said seal lip; an annular groove formed in an outwardly facing surface of said seal lip; a garter spring retained within said groove, said garter spring and said groove being located in a plane parallel to said seal lip and spaced a sufficient distance therefrom so as to radially inwardly bias said seal lip into engagement with said shaft at an annular interface with substantially uniform pressure; an annular recess formed in an inwardly facing surface of said sealing annulus adjacent said ribs; a support ring located within said recess and having in assembly a floating clearance with respect to said recess and said shaft thereby leaving the seal lip free to follow shaft run-out and to grow and shrink according to temperature effects under low-pressure conditions in said chamber, said sealing annulus deforming radially inwardly into contact with said support ring under high-pressure conditions in said chamber at which time said support ring is effective to limit deformation of said seal lip at said interface to a predetermined amount.

References Cited

UNITED STATES PATENTS

| 2,482,029 | 9/1949 | Reynolds | 277—152 |
| 3,010,748 | 11/1961 | Haynie | 277—153 |
| 3,214,179 | 10/1965 | Dega | 277—134 |

OTHER REFERENCES

German Printed Application, Diefenbach, G 11,470, March 1956.

German Printed Application, Amelung, 1,153,578, August 1963.

SAMUEL ROTHBERG, Primary Examiner

U.S. Cl. X.R.

277—153, 180